US012203634B2

(12) United States Patent
Ostermann

(10) Patent No.: US 12,203,634 B2
(45) Date of Patent: Jan. 21, 2025

(54) ADAPTER SYSTEM FOR RELEASABLY CONNECTING A LIGHTING UNIT TO AN ACCESSORY PART

(71) Applicant: BEGA Gantenbrink-Leuchten KG, Menden (DE)

(72) Inventor: Michael Ostermann, Menden (DE)

(73) Assignee: BEGA Gantenbrink-Lechten KG, Menden (DE)

( * ) Notice: Subject to any disclaimer, the term of this patent is extended or adjusted under 35 U.S.C. 154(b) by 11 days.

(21) Appl. No.: 18/038,457

(22) PCT Filed: Nov. 26, 2021

(86) PCT No.: PCT/EP2021/083203
§ 371 (c)(1),
(2) Date: May 24, 2023

(87) PCT Pub. No.: WO2022/112514
PCT Pub. Date: Jun. 2, 2022

(65) Prior Publication Data
US 2024/0011625 A1    Jan. 11, 2024

(30) Foreign Application Priority Data
Nov. 26, 2020   (LU) ..................................... 102249

(51) Int. Cl.
*F21V 21/116*     (2006.01)
*F16M 11/10*      (2006.01)
(52) U.S. Cl.
CPC ........... *F21V 21/116* (2013.01); *F16M 11/10* (2013.01)
(58) Field of Classification Search
CPC ..... F16L 3/02; F16L 3/26; F16L 59/14; F16L 3/16; F01D 25/30; F21V 21/116;
(Continued)

(56) References Cited

U.S. PATENT DOCUMENTS 3,156,418 A    11/1964   Jablonski et al.
6,065,849 A *   5/2000   Chen ...................... A01K 63/06
                                                          362/396
(Continued)

FOREIGN PATENT DOCUMENTS

DE         20217058 U1    2/2003
DE     102018122361 A1 *  3/2020   ................ F21S 2/00

OTHER PUBLICATIONS

English Translation of DE102018122361A1 (Year: 2020).*

*Primary Examiner* — Muhammad Ijaz
(74) *Attorney, Agent, or Firm* — Smartpat PLC

(57) ABSTRACT

An adapter system for releasably connecting a lighting unit to an accessory part comprises an adapter element releasably connectable to the lighting unit, and a peg-shaped engagement element. A receiving recess is accessible from the outside through a receiving opening of the adapter element for receiving the engagement element. A locking device serves to fixate the engagement element within the receiving recess and comprises a locking element. The locking element protrudes into the receiving recess in a locking position. An end region of the locking element protrudes into a locking recess of the engagement element and fixes the engagement element in the adapter element. The receiving recess comprises a receiving abutment region conically narrowing toward the receiving recess. The engagement element comprises a corresponding abutment region, which can be brought into abutment with the conical receiving abutment region by inserting the engagement element into the receiving recess.

10 Claims, 4 Drawing Sheets

(58) Field of Classification Search
CPC ........ F21V 21/14; F21V 17/12; F21V 23/001;
F16M 11/10; F16M 11/04; F16M 13/022;
F21S 8/03
USPC .......................................................... 248/65
See application file for complete search history.

(56) References Cited

U.S. PATENT DOCUMENTS

| | | | |
|---|---|---|---|
| 11,028,606 B1* | 6/2021 | Ovalle | E04H 4/08 |
| 11,739,795 B2* | 8/2023 | Harvey | F01D 25/18 |
| | | | 403/359.6 |
| 2016/0252801 A1 | 9/2016 | Harrison | |
| 2024/0011625 A1* | 1/2024 | Ostermann | F21V 21/116 |
| 2024/0085004 A1* | 3/2024 | Yasuda | F21V 21/116 |

* cited by examiner

ADAPTER SYSTEM FOR RELEASABLY CONNECTING A LIGHTING UNIT TO AN ACCESSORY PART

CROSS-REFERENCE TO RELATED APPLICATION

This application is a national stage application, filed under 35 U.S.C. § 371, of International Patent Application No. PCT/EP2021/083203, filed on 26 Nov. 2021, which claims the benefit of Luxembourg Patent Application No. 102249, filed 26 Nov. 2020.

BACKGROUND

By means of known fastening devices for fastening lighting units to walls, ceilings or rods, the lighting units are fastened directly to the lighting unit housing of the lighting unit, for example by means of a screw connection. In this case, the fastening devices are configured in such a way that the lighting units received therein are arranged to be pivotably displaceable. A releasability of the fastening device from the lighting unit housing is generally not provided. The fastening device comprises a fixing element fixable to the wall or to the ceiling. This may be, for example, a through bore for screwing the fastening device to the ceiling or to the wall. Alternatively, spring-loaded clamping connections are also known, with which the lighting unit can be clamped to a shelf or a railing, for example.

The power supply of the lighting unit is carried out by means of an electrical lead. This is usually inserted directly into the lighting unit housing and electrically conductively connected at corresponding electrical screw or solder contacts. Usually, dismounting of the electrical lead is not provided. Rather, the electrical lead is permanently connected to the lighting unit housing.

For maintenance of an existing lighting unit or replacement of it with a new lighting unit, it is usually necessary to completely disassemble the fastening device and the electrical lead. In addition, for mounting a new lighting unit, further new fastening bores and, if required, a new electrical lead must be laid. On the one hand, this requires different tools. On the other hand, the replacement of an existing lighting unit involves a large amount of time.

SUMMARY

The disclosure relates to an adapter system for releasably connecting a lighting unit to an accessory part, the adapter system comprising an adapter element releasably connectable to the lighting unit, the adapter system comprising a peg-shaped engagement element, the adapter element comprising a receiving recess accessible from the outside through a receiving opening of the adapter element for receiving the engagement element, the adapter element comprising a locking device for fixating the engagement element within the receiving recess, the locking device comprising at least one locking element, wherein the locking element protrudes into the receiving recess in a locking position of the locking element and, with an engagement element inserted into the receiving recess, an end region of the locking element protrudes into a locking recess of the engagement element and fixes the engagement element positively in the adapter element, and wherein the locking element releases the engagement element in a release position.

It is considered to be an object of the present disclosure to provide an adapter system that allows simple and robust mounting and dismounting of a plurality of different lighting units on different accessory parts.

This object is achieved in that the receiving recess comprises, at least in sections, a receiving abutment region which narrows conically toward the receiving recess, wherein the engagement element comprises an abutment region corresponding to the conical receiving abutment region, which can be brought into abutment with the conical receiving abutment region by inserting the engagement element into the receiving recess, and the engagement element is fixable without play within the receiving recess by means of the locking device.

Here, the conically narrowing receiving abutment region can be configured in such a way that it completely penetrates the adapter element and thus forms a frustoconical receiving abutment region within the adapter element. Such a frustoconical receiving recess can be produced particularly easily and cost-effectively in a single manufacturing step.

The abutment region of the engagement element, which is configured to correspond to the receiving abutment region, creates a linear contact surface between the engagement element and the adapter element. Thus, the forces generated by the abutment are distributed over the linear contact surface, resulting in a significantly lower compressive stress within the contact surface as compared to a point-shaped contact surface. Thus, a particularly damage-free and long-term use of the adapter system is possible.

The locking element can advantageously be configured as a cylindrical pin which is displaceable between the release position and the locking position within a guide recess oriented toward the receiving recess within the adapter element. Advantageously, the dimensions and the distances of the guide recess, the locking element and the locking recess are selected such that after inserting the engagement element into the receiving recess and after transfer of the locking element into a locking position, the engagement element remains, via the receiving abutment region, in abutment with the adapter element without play via the abutment region. In order to establish a particularly robust connection between the engagement element and the adapter element, multiple locking elements arranged around the circumference of the receiving recess are optionally and advantageously provided.

Particularly high demands are placed on manufacturing accuracy for the play-free connection of the engagement element within the receiving recess. In particular, the distances between the receiving abutment region and the guide recess must be produced with low manufacturing tolerances. In order to enable cost-effective manufacturing with lower manufacturing tolerances and also to enable a possibility of bracing the engagement element and the adapter element, in an advantageous embodiment of the adapter system, it is provided that the engagement element comprises a transition region arranged between the locking recess and the abutment region, an outer diameter of the engagement element within the transition region increasing continuously toward the abutment region. When transferring the locking element to the locking position, the end region of the locking element slides along the transition region. Due to the fact that the locking element is guided within the guide recess and only allows displacement of the locking element between the locking position and the release position, the sliding causes displacement of the engagement element toward the adapter element. Thus, it is braced within the receiving recess within the adapter element and fixed within the receiving recess without play.

In order to enable particularly frictionless sliding of the end region of the locking element along the transition region of the engagement element, in an advantageous embodiment of the adapter system, it is provided that the end region of the locking element facing toward the locking recess is configured to be rounded or conical. Advantageously, the end region is configured to correspond to the transition region, so that particularly low compressive stresses are generated within the contact surface due to a large contact surface between the locking element and the engagement element, as a result of which a particularly long service life of the adapter system is possible.

In order to enable particularly simple and quick mounting of the engagement element within the adapter element, in a further advantageous embodiment, it is provided that the locking recess is configured in a circumferential manner. Thus, an alignment of the one or more locking recesses of the engagement element relative to the locking element by a rotation of the engagement element or the adapter element relative to each other is not necessary. Furthermore, due to the circumferentially configured locking recess, an alignment of the lighting unit fixed to the adapter element is continuously and steplessly possible.

In a further advantageous embodiment, it is provided that the receiving recess comprises an inlet region and a passage region adjoining the inlet region, the inlet region being configured to be tapered in a conically narrowing manner and the passage region being configured as a cylindrical recess completely penetrating the receiving element. A cylindrical recess is particularly easy to produce by drilling. In this case, the engagement element may be configured in such a way that the conical abutment region is arranged in a rear region of the engagement element and a front region of the engagement element is configured to be cylindrical and comprises the locking recess. In this case, an outer diameter of the front region is configured to be smaller than an inner diameter of the receiving recess, so that the engagement element is guided along the front region within the receiving recess when inserting the engagement element into the receiving recess. An engagement element thus configured can be manufactured particularly cost-effectively.

In order to be able to insert the engagement element particularly easily into the receiving recess, in an advantageous embodiment of the adapter system, it is provided that the engagement element comprises two conical abutment regions corresponding in each case to the receiving abutment region, wherein a first abutment region is arranged in a first engagement element end region of the engagement element facing toward the receiving recess when the adapter system is used as intended, and a second abutment region is arranged in a second engagement element end region of the engagement element opposite to the first engagement element end region, wherein a largest outer diameter of the first abutment region is smaller than a smallest outer diameter of the second abutment region. The conical first abutment region allows for coarse centering of the engagement element relative to the receiving recess and for easy insertion of the engagement element through the receiving opening into the receiving recess. By further displacing the engagement element into the receiving recess until the second abutment region is in abutment with the receiving abutment region, fine centering of the engagement element within the receiving recess of the adapter element is achieved. The subsequent transfer of the locking element to the locking position creates a secure and play-free fit of the engagement element within the receiving element.

In order to ensure a play-free and particularly secure fit of the engagement element within the receiving recess, in an advantageous embodiment of the adapter system, it is provided that a largest outer diameter of the first abutment region is smaller than a smallest inner diameter of the inlet region and a largest outer diameter of the second abutment region is larger than a smallest inner diameter of the inlet region. Thus, in a mounted state of the engagement element within the receiving recess, the second abutment region is in abutment with the inlet region.

In an advantageous embodiment, it is provided that the engagement element comprises, on a side facing away from the receiving element when the adapter system is used as intended, a fastening device for releasably fixing to the accessory part. Accessory parts may be, for example, a ground spike, a screw terminal, a pipe clamp, a tensioning belt, a wood screw or a pole adapter. Thus, there are a variety of possibilities for fastening a lighting unit to different objects by means of the adapter system.

In order to be able to fix the engagement element to the accessory part in a releasable and simple manner, in an advantageous embodiment, it is provided that the fastening device is configured as a screw connection. Advantageously, the engagement element comprises an external thread for this purpose, with which it can be screwed into a corresponding internal thread provided in the accessory part.

The lighting unit may be pivotably fastened to the adapter element by means of an articulated joint, for example. Thus, a light emission direction of the lighting unit can be achieved in a simple manner by rotating the lighting unit about an axis of rotation of the articulated joint.

In an advantageous embodiment of the adapter system, it is provided that, for supplying power to the lighting unit, the adapter element comprises an electrical lead fixed to the adapter element. When the adapter element is dismounted or when the adapter element released from the engagement element is moved, it is not necessary to disconnect the electrical lead. Thus, particularly simple mounting of the adapter system is possible.

In addition, in order for a simple disconnection of the electrical lead to take place when the connection between the adapter element and the engagement element or the accessory part is released, in an advantageous embodiment, it is provided that the electrical lead comprises exposed wire leads at one end facing the adapter element, and wherein the electrical lead comprises, at an opposite end, a cable adapter for connecting the electrical lead to a plug lead. Ends of the exposed wire leads are thus easily insertable into terminals of the lighting unit and electrically connectable. Likewise, instead of the exposed wire leads, a plug is advantageously attachable to the end of the electrical lead, with which the electrical lead for supplying power to the lighting unit is electrically connectable to the lighting unit. The cable adapter can be used to easily connect a further cable, for example a plug cable, which is provided with a desired country plug, so that the electrical lead can be easily connected to the lighting unit. This enables a particularly wide range of modular connection options and thus particularly simple mounting of the lighting unit.

In order to establish a particularly robust and secure electrical connection of the electrical lead to the adapter element, in an advantageous embodiment, it is provided that the electrical lead can be passed through an anti-kink sleeve fixed to the adapter element on the side of the electrical lead facing the adapter element. Thus, kinking of the electrical lead can be prevented during mounting or dismounting of the lighting unit.

Further advantageous embodiments of the adapter system are explained with reference to exemplary embodiments shown in the drawings.

DETAILED DESCRIPTION

Figure 1:
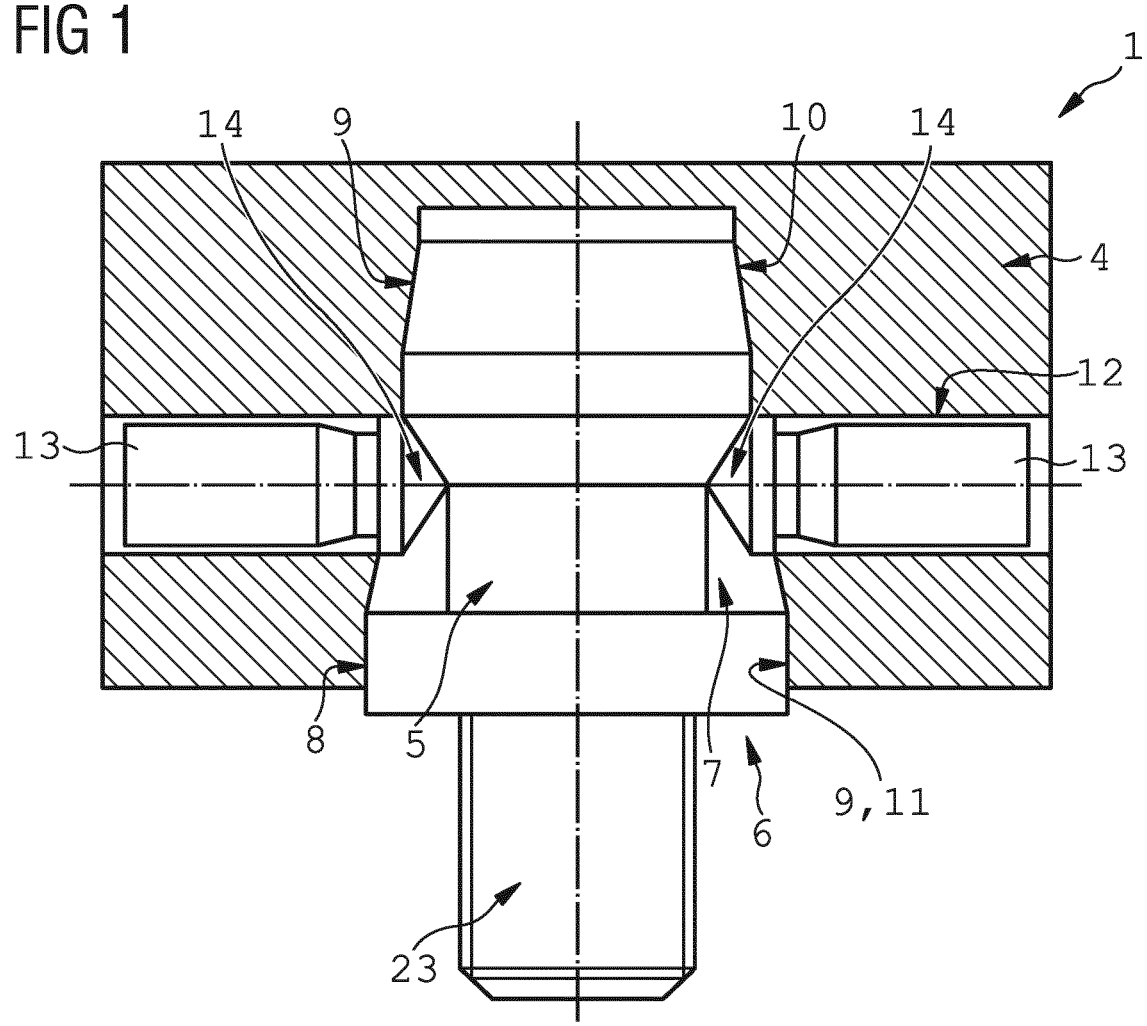
FIG. 1 shows a schematic representation of the adapter system in a sectional view in a side view.

In FIG. 1, a schematic representation of an adapter system 1 for releasably connecting a lighting unit 2 (not shown in FIG. 1) to an accessory part 3 (not shown in FIG. 3) is shown, the lighting unit 2 being fastened to an adapter element 4 of the adapter system 1. A peg-shaped engagement element 5 is inserted into a receiving recess 7 of the adapter element 4 through a receiving opening 6 of the adapter element 4. The receiving recess 7 comprises a conically narrowing receiving abutment region 8. The engagement element 5 comprises two conical abutment regions 9 corresponding in each case to the receiving abutment region 8. A largest outer diameter of a first abutment region 10 of the engagement element 5 is configured to be smaller than a smallest outer diameter of a second abutment region 11 of the engagement element. Both abutment regions 9 are brought into abutment with the receiving abutment region 8. By means of a locking device 12 of the adapter element 4, the engagement element 5 is fixed within the receiving recess 7. For this purpose, two locking elements 13 of the locking device 12 are shown in a locking position. The end regions of the locking elements 13, which are configured to be rounded, protrude into a circumferentially configured locking recess 14 of the locking element 13, so that the engagement element 5 is fixed positively and without play within the receiving recess 7. A fastening device 23 of the engagement element 5 is configured as an external thread of a screw connection. This is screwable into a corresponding internal thread provided in the accessory part 3.

Figure 2:
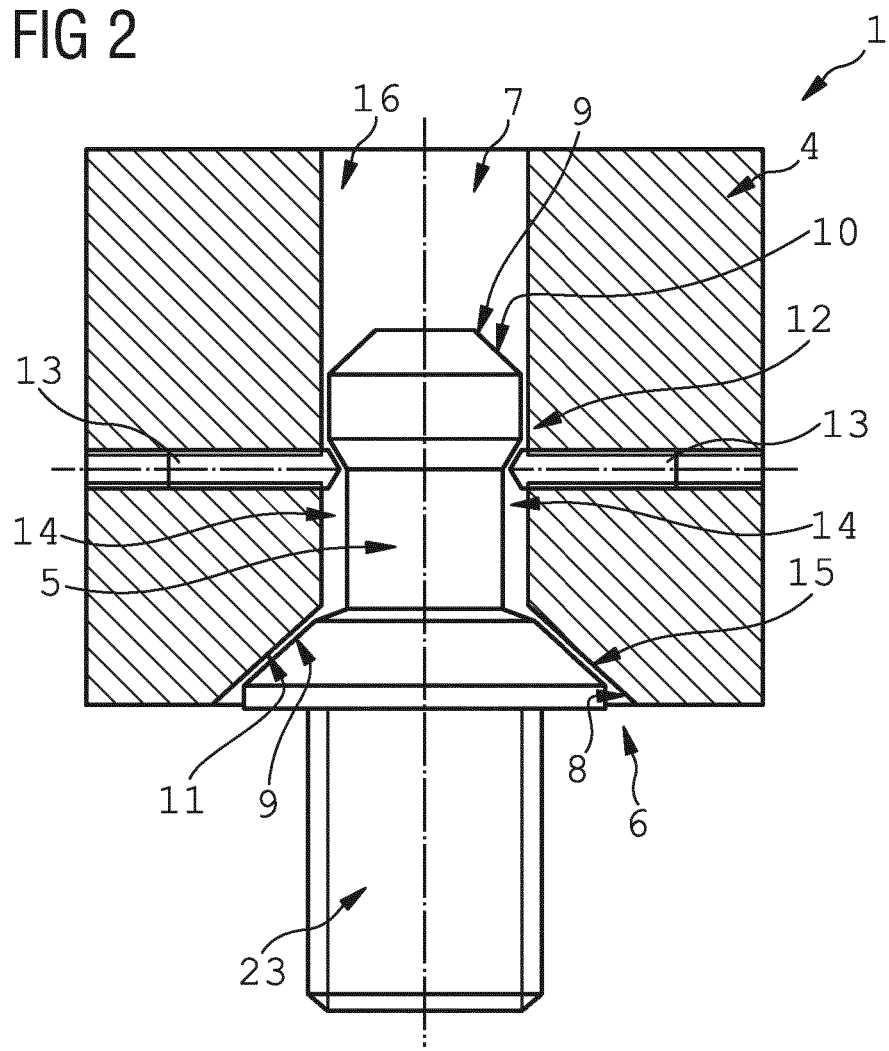
FIG. 2 shows a schematic representation of the adapter system in a further embodiment in a sectional view in a side view.

In FIG. 2, a schematic representation of the adapter system 1 in a further embodiment is shown in a sectional view in a side view. The receiving recess 7 comprises an inlet region 15 and a passage region 16 adjoining the inlet region 15. The inlet region 15 is configured to be tapered in a conically narrowing manner. The passage region 16 is configured as a cylindrical recess completely penetrating the adapter element 4. The engagement element 5 comprises two abutment regions 9. A largest outer diameter of the first abutment region 10 of the engagement element 5 is smaller than an inner diameter of the inlet region 15 and of the passage region 16. Due to the conical first abutment region 10, coarse centering of the engagement element 5 and thus simple insertion of the engagement element 5 through the receiving opening 6 into the receiving recess 7 can take place. By further displacing the engagement element 5 into the receiving recess 7 until a second abutment region 11 of the engagement element 5 is in abutment with the receiving abutment region 8 within the inlet region 15, fine centering of the engagement element 5 within the receiving recess 7 of the adapter element 4 is achieved. The subsequent transfer of the locking elements 13 to the locking position creates a secure and precise fit of the engagement element 5 within the adapter element 4.

Figure 3:
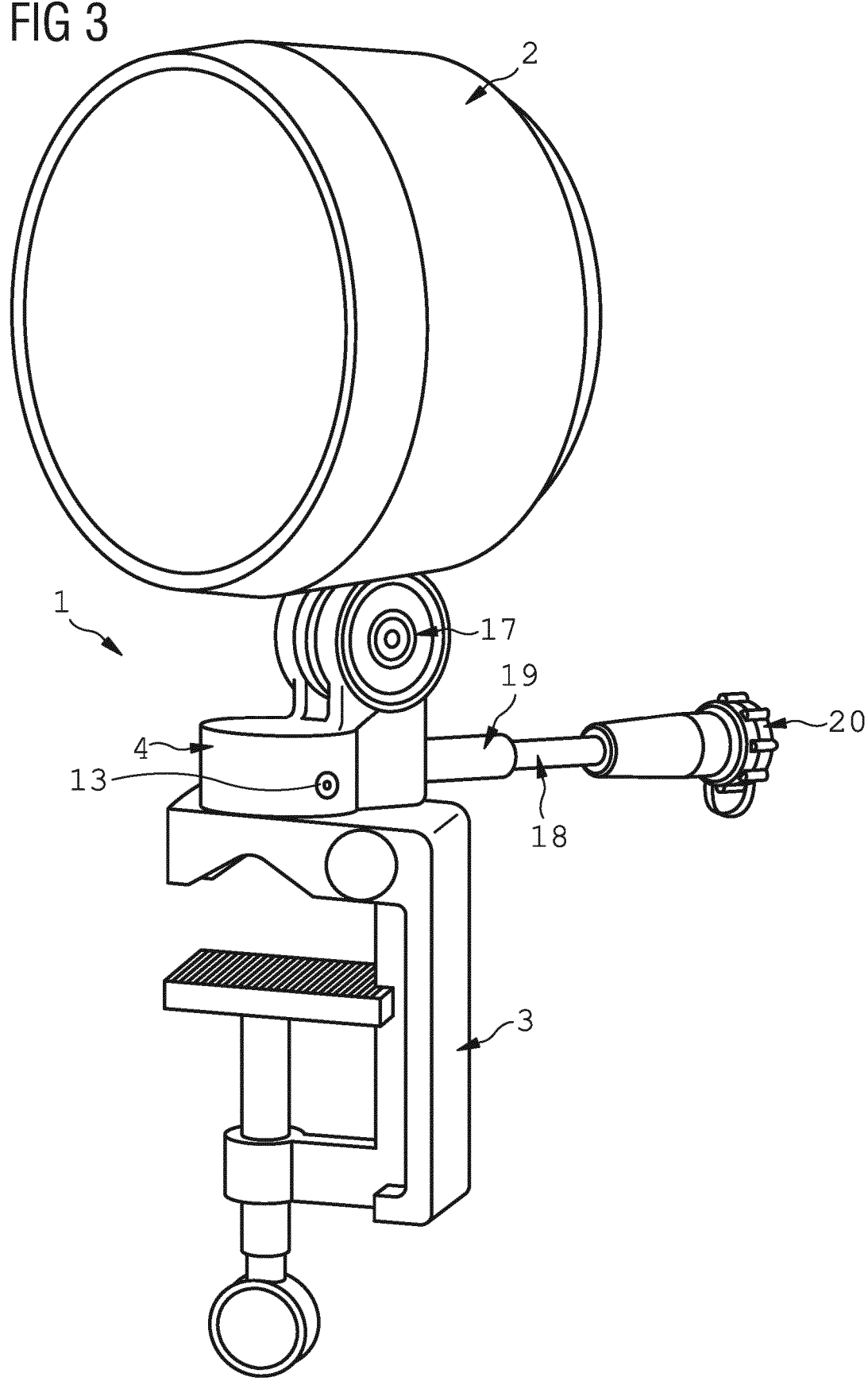
FIG. 3 shows a perspective representation of a lighting unit fastened to the accessory part by means of the adapter system.

In FIG. 3, a perspective representation of a lighting unit 2 fastened to the accessory part 3 by means of the adapter system 1 is shown. The lighting unit 2, which is configured as a spotlight or flood lamp, is fastened to an articulated joint 17 of the adapter element 4 so as to be pivotable with the adapter element 4, whereby a light emission direction of the lighting unit 2 is adjustable by rotating the lighting unit 2 about an axis of rotation of the articulated joint 17. An electrical lead 18 for supplying power to the lighting unit 2 can be passed through an anti-kink sleeve 19 fixed to the adapter element 4. At one end of the electrical lead 18, a cable adapter 20 is provided for connecting the electrical lead 18 to a plug lead 21 shown in FIG. 4. Various plug leads 21 suitable for grid connection in the respective country can be connected through the cable adapter 20. The engagement element 5, which is not shown in FIG. 3, is releasably fixed to an accessory part 3 configured as a screw terminal by means of the locking element 13.

Figure 4:
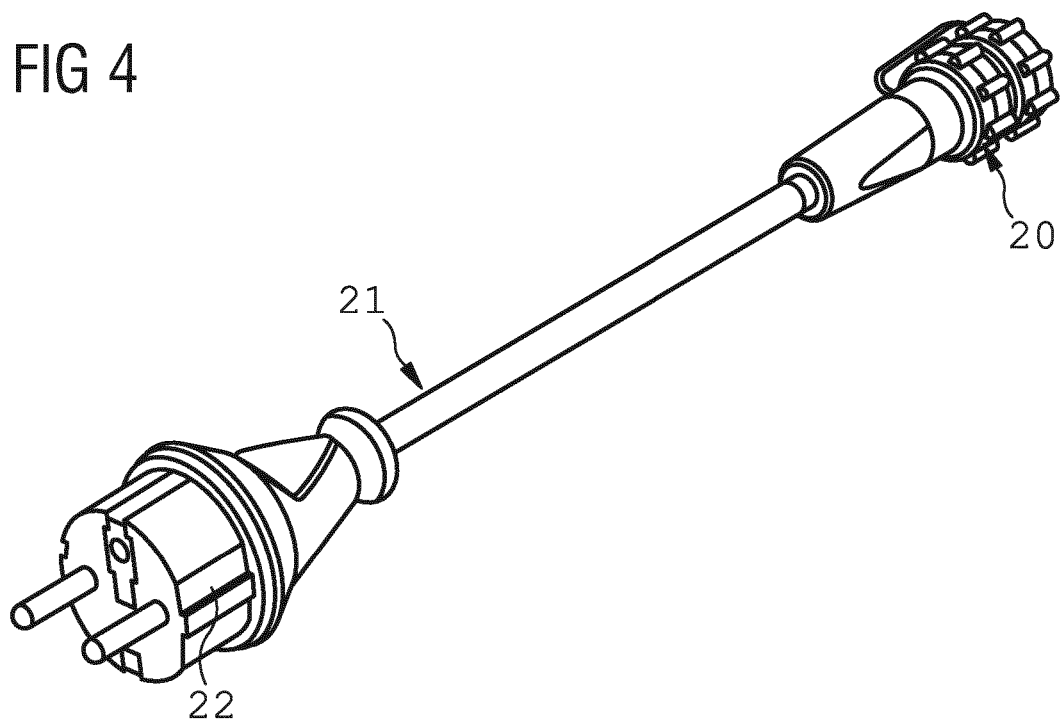
FIG. 4 shows a perspective representation of a plug lead usable for supplying power to the lighting unit.

In FIG. 4, a perspective representation of a plug lead 21 usable for supplying power to the lighting unit 2 is shown. The plug lead 21 comprises a power plug 22 and is connected to the electrical lead 18 shown in FIG. 3 by means of the cable adapter 20.

The invention claimed is:

1. An adapter system (1) for releasably connecting a lighting unit (2) to an accessory part (3), comprising:
   an adapter element (4) releasably connectable to the lighting unit (2),
   a peg-shaped engagement element (5),
   wherein the adapter element (4) comprises
      a receiving recess (7) accessible from an outside through a receiving opening (6) of the adapter element (4) for receiving the engagement element (5), and
      a locking device (12) for fixating the engagement element (5) within the receiving recess (7),
   wherein the locking device (12) comprises at least one locking element (13),
   wherein the locking element (13) protrudes into the receiving recess (7) in a locking position of the locking element (13) and, with an engagement element (5) inserted into the receiving recess (7), an end region of the locking element (13) protrudes into a locking recess (14) of the engagement element (5) and fixes the engagement element (5) positively in the adapter element (4),
   wherein the locking element (13) releases the engagement element (5) in a release position,
   wherein the receiving recess (7) comprises, at least in sections, a receiving abutment region (8) conically narrowing toward the receiving recess (7),
   wherein the engagement element (5) comprises an abutment region (9) corresponding to the conical receiving abutment region (8), which can be brought into abutment with the conical receiving abutment region (8) by inserting the engagement element (5) into the receiving recess (7),
   wherein the engagement element (5) is fixable without play within the receiving recess (7) by the locking device (12), wherein the receiving recess (7) comprises an inlet region (15) and a passage region (16) adjoining the inlet region (15), wherein the inlet region (15) is tapered in a conically narrowing manner, wherein the passage region (16) is configured as a cylindrical recess completely penetrating the adapter element (4), wherein the engagement element (5) comprises two conical abutment regions (9) corresponding in each case to the receiving abutment region (8), wherein a first abutment region (10) is arranged in a first engagement element end region of the engagement element (5) facing toward the receiving recess (7) when the adapter system (1) is used as intended, wherein a second abutment region (11) is arranged in a second engagement element end region of the engagement element (5) opposite to the first engagement element end region, and wherein a largest outer diameter of the first abutment region (10) is smaller than a smallest outer diameter of the second abutment region (11).

2. The adapter system (1) according to claim 1,
wherein the engagement element (5) comprises a transition region arranged between the locking recess (14) and the abutment region (9), and
wherein an outer diameter of the engagement element within the transition region continuously increases toward the abutment region (9).

3. The adapter system (1) according to claim 1,
wherein the end region of the locking element (13) facing toward the locking recess is configured to be rounded or conical.

4. The adapter system (1) according to claim 1,
wherein the locking recess (14) is configured in a circumferential manner.

5. The adapter system (1) according to claim 1,
wherein a largest outer diameter of the first abutment region (10) is smaller than a smallest inner diameter of the inlet region, and
wherein a largest outer diameter of the second abutment region (11) is larger than a smallest inner diameter of the inlet region.

6. The adapter system (1) according to claim 1,
wherein the engagement element (5) comprises, on a side facing away from the adapter element (4) when the adapter system (1) is used as intended, a fastening device (23) for releasably fixing to the accessory part (3).

7. The adapter system (1) according to claim 6,
wherein the fastening device (23) is configured as a screw connection.

8. The adapter system (1) according to claim 1,
wherein, for supplying power to the lighting unit (2), the adapter system (1) comprises an electrical lead (18) fixed to the adapter element (4).

9. The adapter system (1) according to claim 8,
wherein the electrical lead (18) comprises exposed wire leads at one end of the electrical lead (18) facing the adapter element (4), and
wherein the electrical lead (18) comprises, at an opposite end, a cable adapter (20) for connecting the electrical lead (18) to a plug lead (21).

10. The adapter system (1) according to claim 8,
wherein the electrical lead (18) can be passed through an anti-kink sleeve fixed to the adapter element (4) on a side of the electrical lead (18) facing the adapter element (4).

* * * * *